United States Patent
Cali et al.

(10) Patent No.: US 11,087,125 B2
(45) Date of Patent: Aug. 10, 2021

(54) DOCUMENT AUTHENTICITY DETERMINATION

(71) Applicant: ONFIDO LTD, London (GB)

(72) Inventors: Jacques Cali, London (GB); Joao Silva Gomes, London (GB)

(73) Assignee: ONFIDO LTD, London (GB)

( * ) Notice: Subject to any disclaimer, the term of this patent is extended or adjusted under 35 U.S.C. 154(b) by 132 days.

(21) Appl. No.: 16/245,453

(22) Filed: Jan. 11, 2019

(65) Prior Publication Data
US 2019/0213408 A1 Jul. 11, 2019

(30) Foreign Application Priority Data
Jan. 11, 2018 (EP) .................................. 18151286

(51) Int. Cl.
| | | |
|---|---|---|
| *G06K 9/34* | (2006.01) | |
| *G06K 9/00* | (2006.01) | |
| *G06N 3/04* | (2006.01) | |
| *G06K 9/68* | (2006.01) | |
| *G06K 9/32* | (2006.01) | |
| *G06F 40/109* | (2020.01) | |

(52) U.S. Cl.
CPC ....... *G06K 9/00456* (2013.01); *G06F 40/109* (2020.01); *G06K 9/00463* (2013.01); *G06K 9/3233* (2013.01); *G06K 9/6828* (2013.01); *G06N 3/0454* (2013.01); *G06K 2209/01* (2013.01)

(58) Field of Classification Search
CPC ............. G06K 9/00456; G06K 9/6828; G06K 9/3233; G06K 9/00463; G06K 2209/01; G06F 40/109; G06N 3/0454
See application file for complete search history.

(56) References Cited

U.S. PATENT DOCUMENTS

| | | | | |
|---|---|---|---|---|
| 7,009,612 B2 * | 3/2006 | Hakamada | ............ | G06T 11/203 345/467 |
| 7,529,761 B2 * | 5/2009 | Wen | ...................... | G06F 40/169 |
| 7,537,170 B2 * | 5/2009 | Reed | ...................... | G06T 1/0042 235/375 |

(Continued)

FOREIGN PATENT DOCUMENTS

| | | |
|---|---|---|
| EP | 2927843 A1 | 10/2015 |
| WO | 2004051917 A1 | 6/2004 |

OTHER PUBLICATIONS

"Training Both Positive and Negative Data with Naive Bayesian Classification?", XP002782547. Available online at: https://stats.stackexchange.com/questions/290631/training-both-positive-and-negative-data-with-naive-bayesian-classification, Retrieved from Internet on Jun. 26, 2018, Jul. 9, 2017, 1 page.

Bengio, et al., "Deep Learners Benefit More from Out-of-Distribution Examples", Proceedings of the 14th International Conference on Artificial Intelligence and Statistics (AISTATS), JMLR, vol. 15, Jan. 1, 2011, pp. 164-172.

(Continued)

*Primary Examiner* — Samir A Ahmed
(74) *Attorney, Agent, or Firm* — Kilpatrick Townsend & Stockton LLP

(57) ABSTRACT

A computer-implemented method for assessing if characters in a sample image are formed from a predefined font. The method comprises forming a first embedded space representation for the predefined font, extracting sample characters from the sample image, forming a second embedded space presentation of the sample characters, and comparing the first and second embedded space representation to assess if the sample characters are of the predefined font.

18 Claims, 8 Drawing Sheets

(56) References Cited

U.S. PATENT DOCUMENTS

| | | | | |
|---|---|---|---|---|
| 7,720,830 | B2* | 5/2010 | Wen | G06F 16/904 707/705 |
| 8,144,368 | B2* | 3/2012 | Rodriguez | G06T 1/0021 358/3.28 |
| 2008/0059803 | A1* | 3/2008 | Tung | G06K 9/00899 713/176 |
| 2009/0263019 | A1* | 10/2009 | Tzadok | G06K 9/00852 382/176 |
| 2012/0099792 | A1* | 4/2012 | Chevion | G06K 9/344 382/182 |
| 2015/0063688 | A1* | 3/2015 | Bhardwaj | G06K 9/3258 382/159 |
| 2015/0262347 | A1* | 9/2015 | Duerksen | G07D 7/20 382/182 |
| 2015/0278658 | A1* | 10/2015 | Hara | G06K 9/342 358/1.9 |
| 2016/0307347 | A1* | 10/2016 | Matteson | G06F 40/109 |
| 2018/0089151 | A1* | 3/2018 | Wang | G06K 9/00852 |

OTHER PUBLICATIONS

EP18151286.4, "Extended European Search Report", dated Sep. 10, 2018, 16 pages.
EP18151286.4, "Partial EP Search Report", dated Jul. 13, 2018, 15 pages.
He, et al., "Deep Residual Learning for Image Recognition", IEEE Conference on Computer Vision and Pattern Recognition, Jun. 27-30, 2016, pp. 770-778.
Hosseini, et al., "Similarity-Based Text Recognition by Deeply Supervised Siamese Network", arXiv:1511.04397v5, XP055436684, Available online at: https://arxiv.org/pdf/1511.04397.pdf, Jul. 5, 2016, 11 pages.
Jung, et al., "Text Information Extraction in Images and Video: A Survey", Pattern Recognition, The Journal of the Pattern Recognition Society, vol. 37, No. 5, May 2004, pp. 977-997.

* cited by examiner

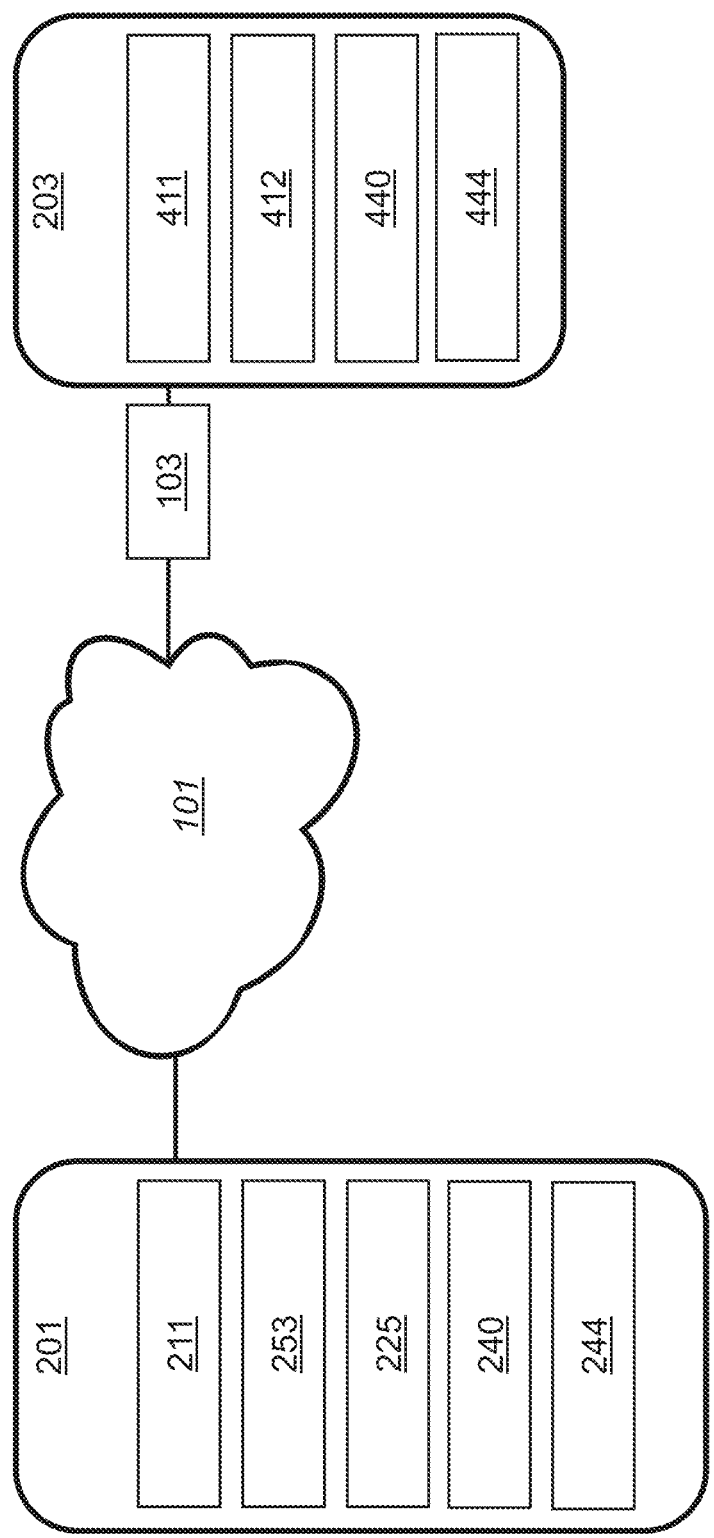

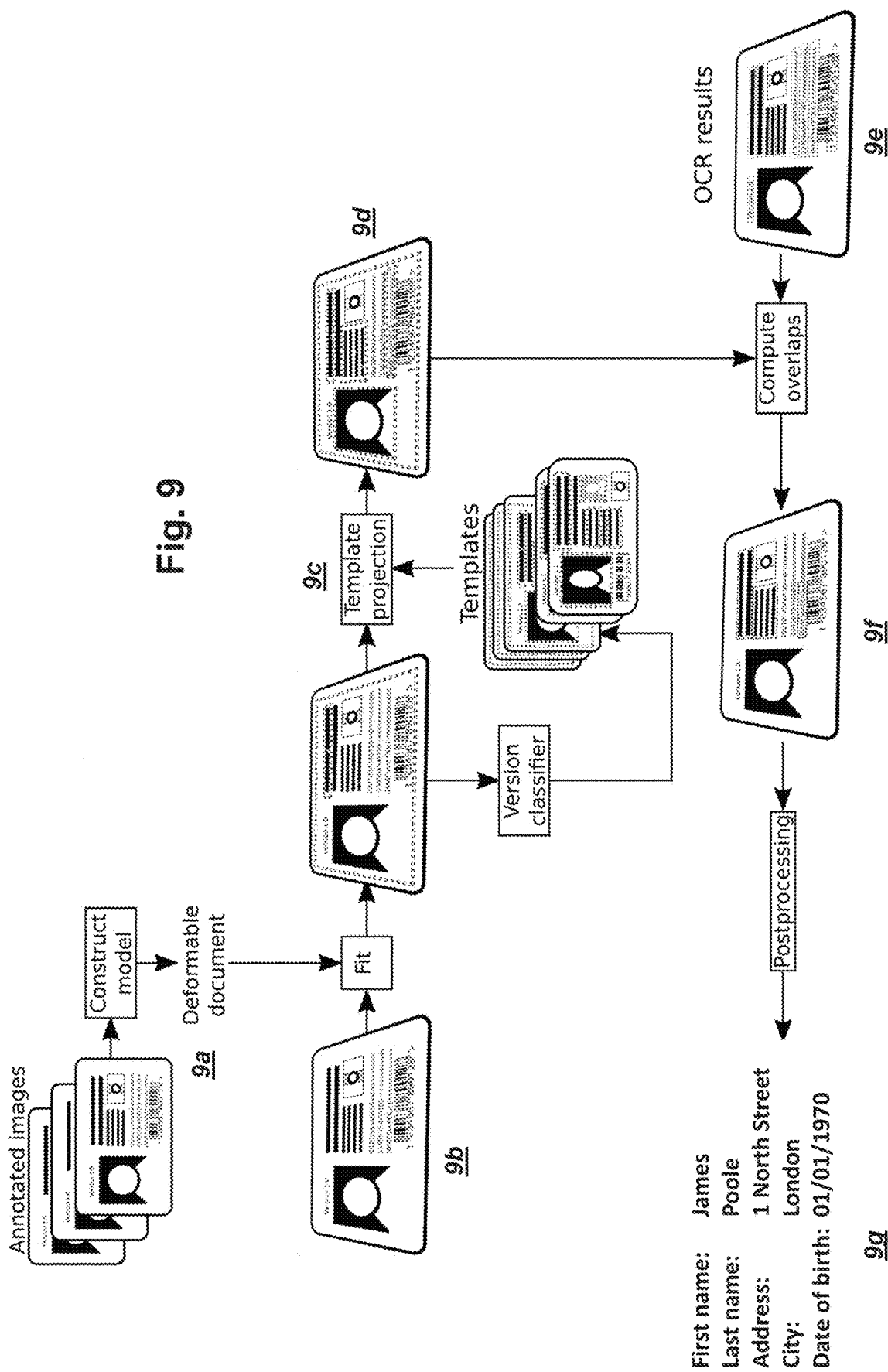

DOCUMENT AUTHENTICITY DETERMINATION

CROSS-REFERENCES TO RELATED APPLICATIONS

This application claims priority to European Patent Application Number 18151286.4, filed Jan. 11, 2018.

FIELD OF THE DISCLOSURE

The present disclosure relates to determining the authenticity of documents. More specifically, the present disclosure relates to a computer-implemented method for assessing if characters in a sample image are of a predefined font type.

BACKGROUND OF THE INVENTION

Official documents are often used to check and test the details of people. This is typically done manually. For example, a representative of a car rental company may check a customer's driving license before authorising the rental of a car to the customer. Such checking implicitly requires manual verification of the presented documents.

One problem that is encountered is that people may use forged or counterfeit documents to present false details. In the case of manual verification, the authenticity of a document is assessed using an assessor's experience and many factors are taken into account. Often, an assessor will suspect a presented document is not authentic but will not be able to identify on what factor they base their assessment. An assessor's ability to assess documents will also be limited by their experience with particular types of documents. Therefore, it is likely that an assessor will struggle to accurately assess rarely used documents or documents of a new type with which they have limited experience.

Manual verification is therefore a highly skilled and labour intensive process that may lead to uncertainty and processing bottlenecks. For this reason, various systems have been developed to assist and automate aspects of this assessment. One such system uses a barcode scanner to scan a barcode on a document and check that the barcode relates to a valid number, or a number that is associated with the details presented on the document.

However, such systems have drawbacks. For example, an up to date database of the associated information must be maintained to avoid false alerts being raised with genuine documents. To correctly assess the authenticity of presented documents, the systems will also need to cope with all previous versions and multiple different types of genuine documents. For example, driving licenses from one country can have a different format and structure to driving licenses from another country, and it is impossible for a human assessor to have detailed knowledge of the various types and format of authentic documents which are permitted. As another specific example, the formatting of a barcode on recently issued driving licenses might be different to older driving licenses and an automated authenticity assessment system using barcodes needs to have details of both versions of the driving license to perform assessment correctly.

Moreover, not all documents use the same anti-forgery or anti-counterfeiting measures and it is unfeasible to have a system that can deal with all of the possible measures that may be presented.

Given the vast number of types of documents that may be presented, and the many versions of each document type that may be presented, this is an extremely challenging task.

BRIEF SUMMARY OF THE INVENTION

The present invention is defined by the independent claims, with further optional features being defined by the dependent claims.

According to a first aspect of the invention there is a computer-implemented method for assessing if characters in a sample image are formed from a predefined font comprising: forming a first embedded space representation for the predefined font; extracting sample characters from the sample image; forming a second embedded space representation of the sample characters; and comparing the first and second embedded space representations to assess if the sample characters are of the predefined font. The use of an embedded space representation enables a more exacting comparison of the extracted font characters and also improves the accuracy of the method when the sample image has imaging artefacts.

Forming a first embedded space representation for the predefined font may comprise extracting training characters from at least one image, the training characters comprising characters of the predefined font; and forming a first embedded space representation for the predefined font using the training characters. Generally, the predefined font is a characteristic font of an authentic document. In some cases, the at least one image may comprise at least one image of at least one authentic document, and the sample image may comprise an image of a sample document to be tested for authenticity. Using existing images of authentic documents to form the embedded space representation means the method can be easily extended to apply to new document types and new fonts. The at least one image of at least one authentic document comprises a plurality of fonts. This enables the embedded space model, which is the system that is used to form the embedded space representations, to form high-quality embedded space representations.

The training characters comprise characters from at least two fonts, one of which is the predetermined font. This means that the embedded space representations, which are formed by the embedded space model, can be formed in such a way so as to enables analysis of the embedded space representations to distinguish the characters of the predetermined font from other fonts.

The method may be used to test the authenticity of a sample document, and may determine whether or not the sample document is authentic using the result of the assessment on whether the sample characters are of the predefined font. Using a font to assess authenticity is advantageous as it is a subtle factor that counterfeiters may overlook. Additionally, in contrast to other anti-counterfeiting measures, almost every official document has text that can have its font assessed for authenticity.

Extracting training characters, or extracting sample characters, may comprise, for each image of the at least one image, or sample image, segmentation of the image into one text field or a plurality of text fields. The text fields are separated from one another. In some cases, segmentation of the image to extract at least one text field may include extracting a text field image of the one or more text fields. Extracting the text fields and/or text field image reduces the amount of data that is associated with each image and thereby enables more advanced analysis to be performed on the extracted data.

Extracting training characters from at least one image of at least one authentic document may comprise labelling the text field image with one text field or a plurality of text field labels. In some cases, extracting training characters from at least one image comprises labelling each of the at least one images with one document label or a plurality of document labels. Extracting sample characters may also comprises a similar labelling process to that used for the training characters. Specifically, it comprise labelling the sample document with one sample document label or a plurality of sample document labels. Labelling the text fields provides context for the extracted data. Therefore, the extracted data can be assigned in the relevant category. For example, the text in a text field labelled as "name" will be extracted and automatically assigned as the data that provides a name.

Extracting training characters from at least one image, or extracting sample characters from the sample image, may comprise segmentation of the text field image to extract character images. In some embodiments, this segmentation comprises the process of converting the text field image to grayscale, thresholding the grayscale image of the text field using a threshold value, removing all pixel groups in the threshold image that contain less than a number of pixels, identifying all remaining pixel groups, identifying the minimal bounding box for identified pixel groups; and using the minimal bounding box to extract character images from the text field image. In some cases, the number of pixels for the thresholding step is 30 pixels. The remaining pixel groups may then be labelled consecutively from "0", indicating background, to "N", indicating the Nth object, with a specified 8-connected pixel grid. Extracted character images may be resized to a convenient size, such as a height of 105 pixels. Extracting training characters yet further reduces the amount of data that is associated with each image and thereby enables more advanced analysis to be performed. The above-described segmentation process has also been found to provide a particularly robust and fast segmentation process that reliably extracts the character images even when the original images are of degraded quality.

Segmentation of the text field image to extract character images may comprise using character classification to obtain at least one character label and to order character images into an ordered list of character images. Optionally, the at least one character label comprises a character label for each extracted character image. This provides a very convenient format of data for subsequent analysis. In some embodiments, character classification comprises using a convolutional neural network to extract features from the characters images. The architecture of the convolutional neural network may comprise two fully connected layers at the end to perform the final classification. The probabilistic nature of the method means that the character classification does not have to be complete or entirely correct, as the method is tolerant of mistakes in classification. Relatedly, the use of a convolutional neural network enables the system to adapt, or to be updated, as required to ensure the result of the character classification is of sufficient quality for the method to correctly assess a font, and documents containing the font.

The convolutional neural network architecture is optimized for use with generated images, and/or the convolutional neural network is trained using generated images. One process to generate the generated images includes: randomly selecting a background and randomly selecting a font, generating a test image comprising a character of the selected font on the selected background, perturbing the test image by a random image processing process. The random image processing set may be at least one of: applying a perspective transform, changing the lighting, applying a random glare effect, adding noise, adding blur, and translating the image to uncentre it. Changing the lighting may comprise adjusting the brightness and/or contrast in the colour channels of the test image. Using generated images is a convenient way to generate a large number of images, which is advantageous for training a convolutional neural network. Additionally, the method can use real fonts and real backgrounds which improves the training since the generated images are similar to the images that are processed in use. The effect of the perturbations is to ensure that the trained convolutional neural network is able to account for image artefacts and images of old or degraded documents.

Optionally, the ordered list of characters images and the at least one character label are used to form a list of pairs, each pair being two images of the same character in either a font that is the same, or a font that is different. Forming the list of pairs may comprise using: the at least one text field label, and the at least one document label, and a database that has been compiled from data acquired by manually inspecting at least one pair of sample documents of a known type. The list of pairs is a convenient format of data for subsequent processing and serves to provide outcomes to test/train the embedded space model.

Forming the list of pairs may use weak labelling, which may comprise weak labelling using prior knowledge on the relationship between the plurality of text fields. The prior knowledge is generally acquired before the step of extracting training characters from at least one image of at least one authentic document is performed. The relationship between the plurality of text fields may be described by the result of a comparison of the font of a pair of text fields from the plurality of text fields. The relationship comparison outcome may be one of same, different, or unknown. Weak labelling therefore uses prior knowledge about the documents to assist the labelling of document fields, enabling a large number of valid character pairs to be automatically created. This weak labelling technique therefore provides a practical alternative, or assistive, method to exhaustive manual labelling.

An embedded space model may be formed using the list of pairs and may comprise a function for converting image data into a real-valued vector. An embedded space representation may be formed using: the embedded space model; the ordered list of character images; and the at least one character label; and, optionally, the text field label and the document label. In some cases, the vector has a length of 2048. The function may comprise a converting convolutional neural network, which may have 50 layers. This has been found to be a particularly convenient and efficient architecture for this particular step. The embedded space model may have been generated, or formed, using a Siamese network. The use of the Siamese network in conjunction with the convolutional neural network helps form, or train, an embedded space model that efficiently forms high quality embedded space representations.

Extracting sample characters from the sample image may comprise obtaining a list of embedded representations of the character images using the Siamese network. Typically, each embedded representation in the list of embedded representation comprises a character label from the at least one character label. The operation of the Siamese network may comprise processing batches of samples and using a contrastive loss function. This configuration forces the resultant convolutional neural network, which is an aspect of the embedded space model, to discriminate between fonts that may appear very similar. This enables the embedded space model to form embedded space representations which, when analysed, better distinguish between the fonts of the characters that are used to form the respective embedded space representations.

In some embodiments, the steps up to, or including, the step of forming a first embedded space representation are performed as an initialization before the authenticity of any document is assessed. Any improvement or retraining, especially that of the embedded space model, can be performed when the system is not being used, and may be tested on offline copies of the system. This ensures that the system's image processing downtime is minimized. A Siamese network may be used to update, train, or retrain the converting convolutional neural network that produces the embedded space representation. Thus any changes can be taken into account before the authenticity of any document is assessed.

The steps of extracting sample characters, forming a second embedded representation and comparing the first and second embedded space representations may be repeated for every sample image that is processed. Every processed document therefore receives a unique test and the quality of the testing is consistent.

The embedded space model forms a second embedded space representation for the sample image using the extracted sample characters. Optionally, each second embedded space representation may be compared to a first embedded space representation formed using a reference database. In some cases, new official documents may be added to the reference databases by labelling them and adding them to the database. Comparison of the embedded space representations may include computing the similarity of the embedded space representations and calculating a final similarity score by averaging the calculated similarity scores. Preferably, the final similarity score is compared to a threshold to decide if the representations are similar and thereby decide if the sample document is genuine. The outcome of the assessment may then be used to decide whether the sample characters are of the predefined font. This outcome may then be communicated to a user. This therefore enables a simple control that an untrained user can adjust as necessary to attain, a required performance, such as a required level of discrimination.

Optionally, the above-mentioned characters are textual characters.

In some cases, operator decisions as to whether a font in a selected text field is genuine or not is used to update operational parameters.

Some embodiments relate to a computer-readable medium comprising executable instructions for performing the method of any one of preceding claims.

Some embodiments relate to a computer comprising a processor configured to execute executable code stored in memory, wherein the executable code comprises instructions for performing the method of any one of preceding claims.

BRIEF DESCRIPTION OF THE DRAWINGS

The present disclosure is made by way of example only with reference to the accompanying drawings in which:

FIG. 2 is a diagram showing components of the system of FIG. 1;

FIG. 9 is a flow diagram of a semantic labelling process according to an embodiment of the invention.

DETAILED DESCRIPTION OF THE INVENTION

Figure 1:
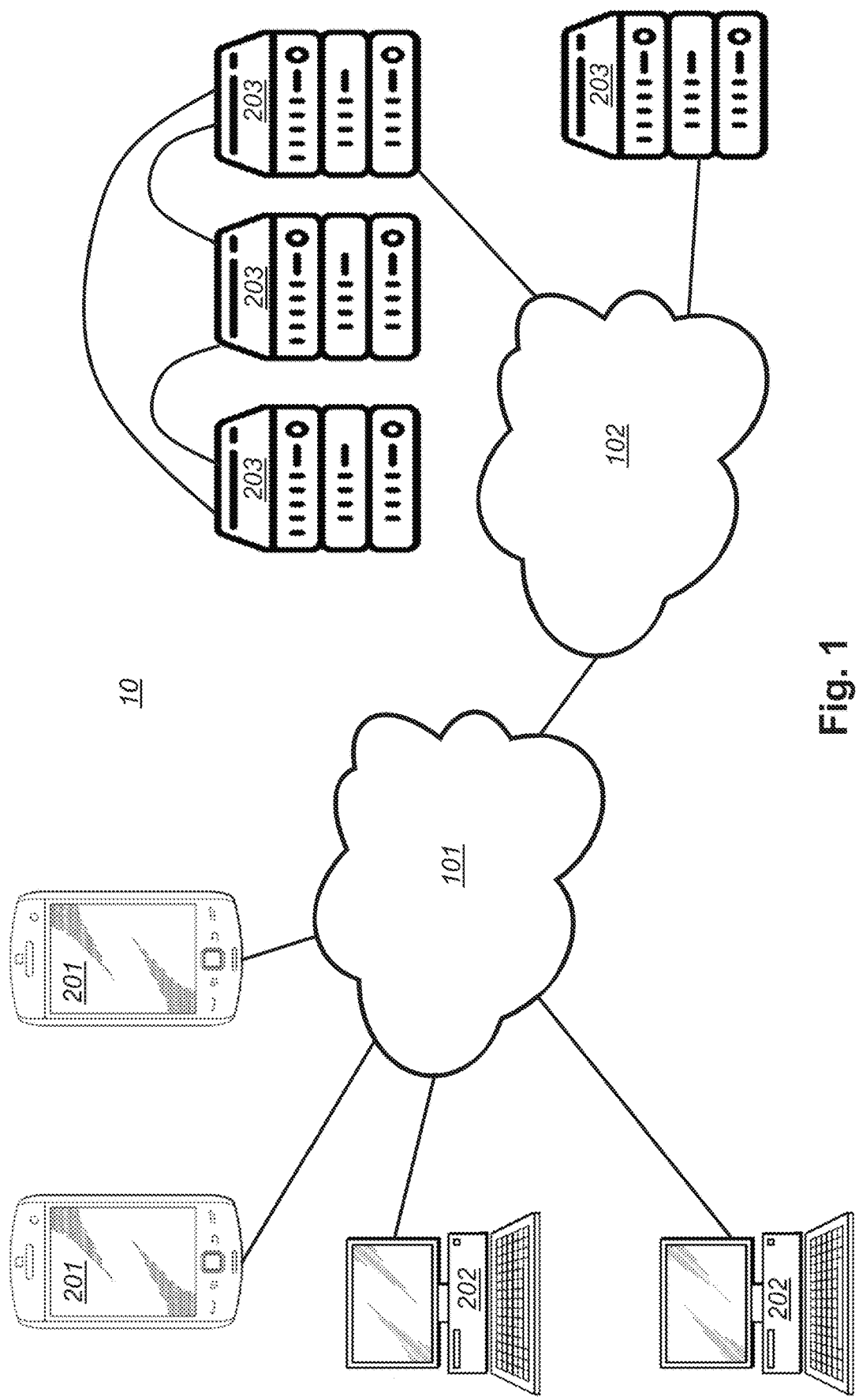
FIG. 1 is a component diagram of a system that may be used to implement the present invention.

FIG. 1 shows a system 10 in which according to one embodiment the invention is implemented. The system comprises electronic devices 201, 202, including mobile electronic devices 201, fixed location electronic devices 202 and servers 203. The electronic devices are in communication with at least one communication network 102 (which may include, but not necessarily include wireless network 101). Data may be communicated between the electronic devices. The at least one communication network may comprise the Internet, The wireless network may for example be a cellular or WiFi communication network, or any other conventionally known wireless communication network. The described network architecture is only exemplary and modifications to it, including removing or adding of network components are possible without affecting the operation of the invention.

FIG. 2 shows selected aspects of the network system 10 shown in FIG. 1. Specifically, it shows a mobile electronic device 201 in communication, over the wireless network 101, with a server 203. The server 203 is an electronic device that can be accessed across the network 102 by devices 201, 202 to perform computational tasks. The mobile electronic device 201 comprises a communication subsystem 211 to enable communication across the wireless network 101. The mobile electronic device 201 further comprises at least one application 225 that can be executed on a processor 240 and a camera 253 that can be used to acquire image data. The image data and applications 255 are stored in memory 244 on the mobile electronic device.

FIG. 2 also shows a server 203 which is connected to the wireless network 101 by a wireless network interface 103 and a network interface 411. The server 203 further comprises applications 412 that can be executed on a processor 440. The server further comprises memory 444 on which the applications 412 and any data that is received from the wireless network 101, and any electronic device connected thereto, can be stored. The server 203 may be distributed and comprise multiple servers, several processors and/or several memory storage locations. Such a distributed server may operate by distributing computational tasks and data across its constitute parts and may communicate with other servers to perform computational operations.

Figure 4:
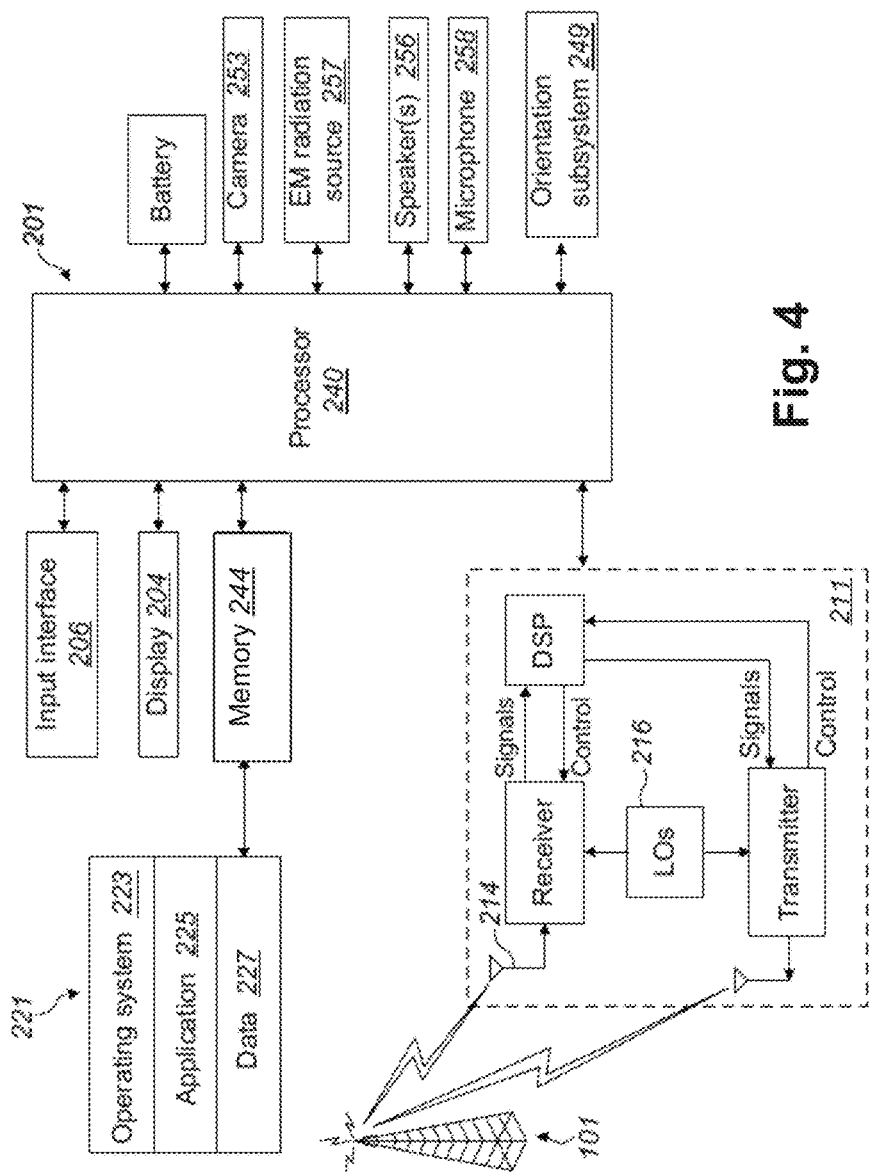
FIG. 4 is a schematic diagram of components of the electronic device of FIG. 3.
Figure 3:
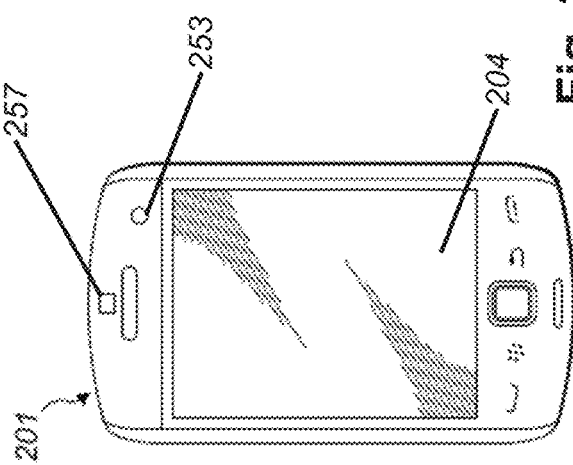
FIG. 3 is a front view of a user electronic device that may operate according to the present invention.

FIGS. 3 and 4 provide further details of the mobile electronic device 201 through which a user may work the invention as described herein. The mobile electronic device 201 comprises a display 204, the camera 253, and an electromagnetic (EM) radiation source 257 for illuminating the area to be imaged with the camera 257. The mobile electronic device 201 is an example of a user electronic device by which a camera 253 may be used to capture image data of an official document 100. This image data may be communicated over the wireless network 101 to the server 203 and stored in the server memory 444. In the server 203, application software of the stored applications 412 executes on the processor 440 to ascertain the authenticity of the official document 100 corresponding to the received image data, as explained in an exemplary embodiment below. The result of this assessment may be communicated back across the wireless network 101 to the mobile electronic device 201 and displayed on the display 204 to a user. It will be understood that the system 10 described above is merely an exemplary system 10 for implementing the invention defined herein.

The official document 100 may take one of many forms such as a driving license, a passport, a utility or other bill, a birth certificate, a benefits book, an state identify card, or a residency permit. The term "official document" is therefore intended to cover any document that contains structured information that may be used to verify a person's identity or an aspect relating to a person, such as their address.

Figure 5:
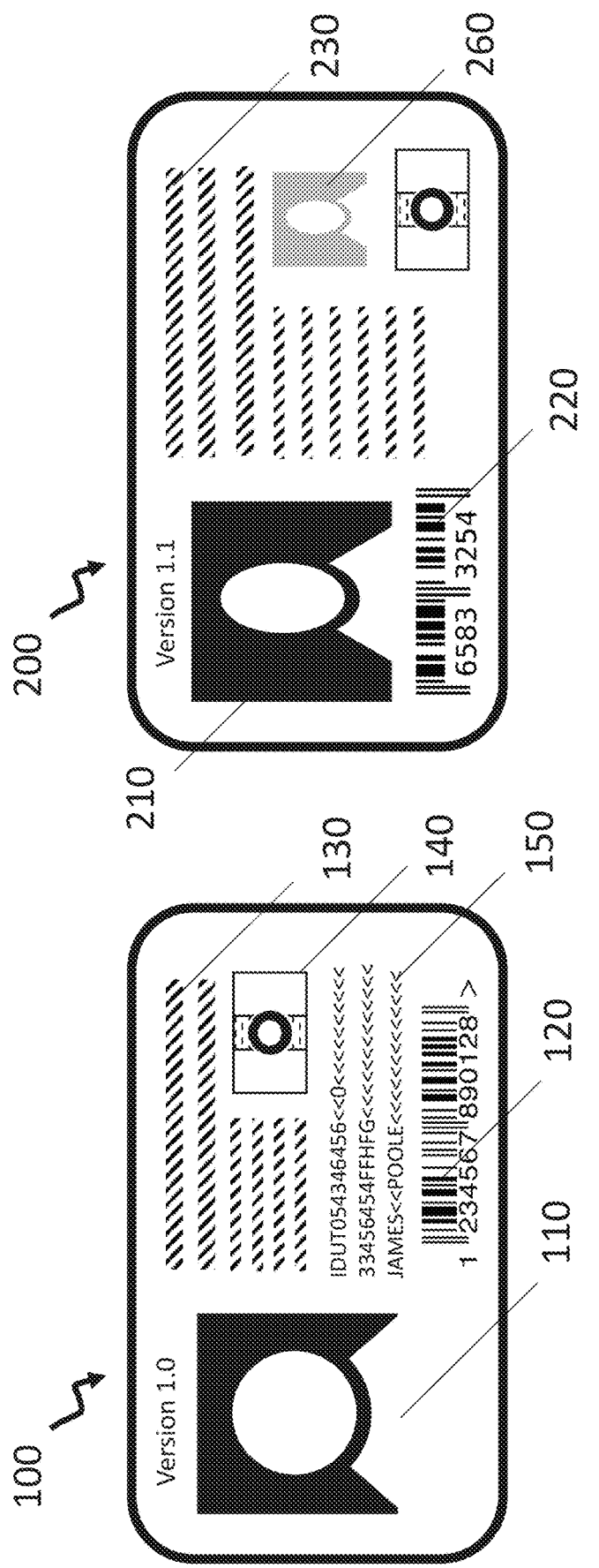
FIG. 5 is a block wireframe image of two different official documents which could be processed according to the invention.

Referring to the left hand side of FIG. 5, there is a first official document 100 of a first type and first version, which comprises at least one feature such as a photo 110, a barcode 120, one or more lines of text 130, a machine-readable zone (MRZ) 150, or a symbol such as a national flag 140. The text 130 may be positioned in set locations within the official document 100. The text 130 may also be in a particular format and type, possibly including a particular font. The text in each location may also be limited to one or a subset of possible options. As an example, in an exemplary official document, 8 mm in from the left edge and 20 mm down from the top edge may be an identifiable term in a given font of a given font size, for example the term "DRIVING LICENSE" in 10 point size of a special font. To reduce the likelihood of counterfeiting, the structure and format of the official document 100 may be restricted or difficult to obtain.

Referring to the right hand side of FIG. 5, there is a second official document 200 of the first type and a second version. Both first 100 and second 200 official documents may be taken to be presented documents that relate to a particular person. By looking at FIG. 5, it is clear that a variety of features, such as the MRZ, that are present in the first official document 100 are not present on the second official document 200. Additional features, such as a different image 260 may be present, and in some cases the relevant information in the images or text will have changed. For example, the photo 110 in the first official document 100 may differ from the photo 210 in the second official document 200 as an updated or changed photograph has been used. The same may also be said for the first barcode 120 and second barcode 220, and the first text 130 and second text 230.

The font of the first official document 100 and second official document 200, or the font of text in particular positions, such as first text 130 and second text 230 may be similar. In an exemplary situation in which the first official document 100 is known to be authentic, the authenticity of the second document 200 can be assessed. This assessment can take place regardless of the differing information that is presented in the second official document 200. It is not necessary that the same words, or even characters, are present to ascertain if the characters match the font used in the first official document 100. Testing of the font is thus a flexible and adaptable way to ascertain the authenticity of presented documents.

However, the automation of the assessment of font authenticity is challenging because it is difficult to describe a font sufficiently to distinguish its characters from a similar font without incorrectly excluding characters of the same font. This difficulty is exacerbated by other factors that may be present in the automatic assessment process, such as the possibility of imaging artefacts in the assessed images. Additionally, for some fonts and some official documents, some of the fonts that are used are difficult to acquire information on. This may be because it is illegal to digitally store certain representations of the font. In some cases, as an anti-counterfeiting means, the particular font may have been designed to make it difficult to reproduce or to require extensive analysis to discern the font from other similar fonts.

Figure 6:
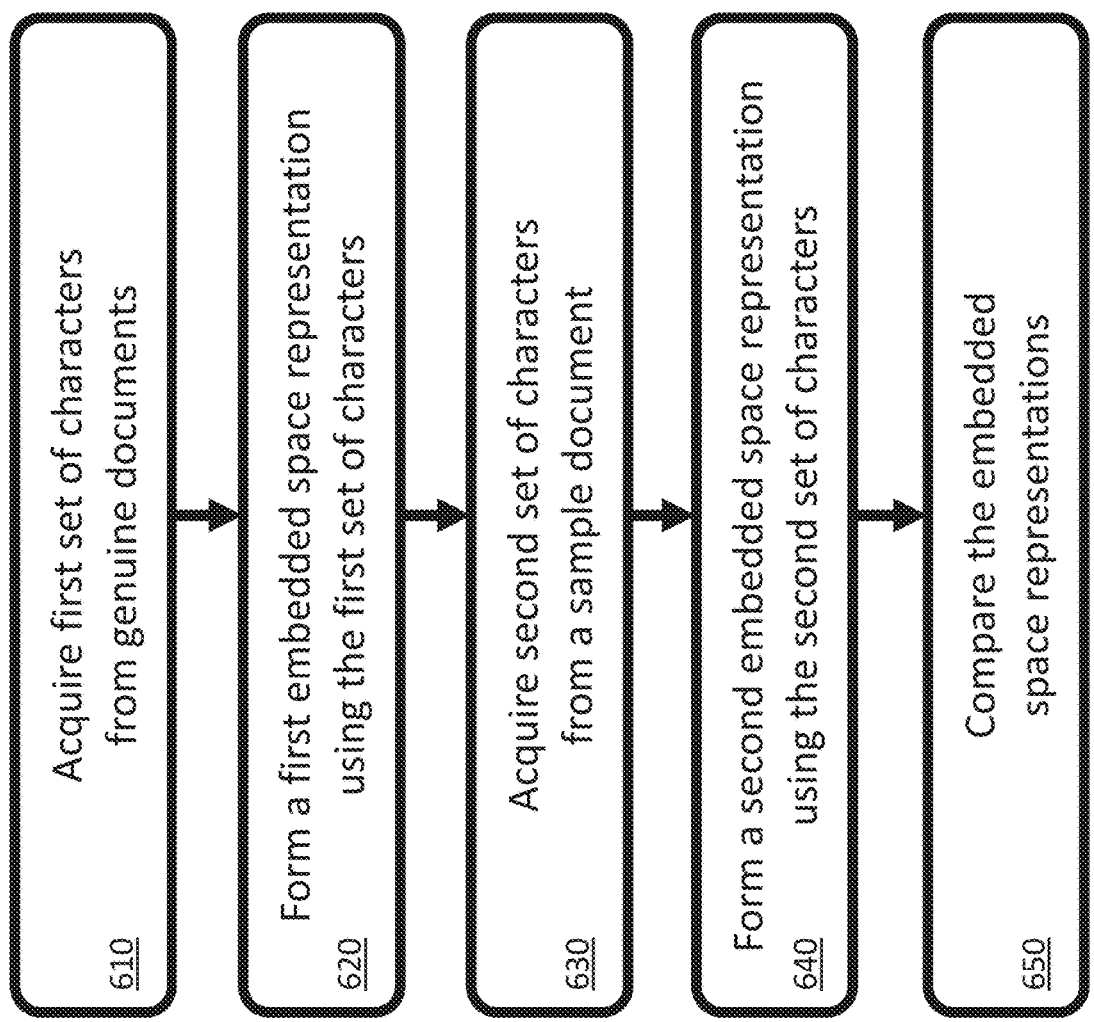
FIG. 6 is a flow diagram of a process according to an embodiment of the invention.

The present invention provides a method to check and determine font authenticity. Referring to FIG. 6, one exemplary method according to the present invention comprises four steps, each of which will now be explained in detail below.

Step 610 comprises acquiring a first set of characters from a genuine document. This may be performed by using camera 253 of a mobile electronic device 201 to take an image of an official document 100 which is transmitted to server 203 which extracts the characters. The acquired set may be called extracted training characters. The acquisition comprises analysis of image data of the genuine document. The image data may include multiple documents or a document in a background setting. In which case, the subset of the image data relating to the document is selected from the full image data. In other words the image is cropped to the relevant portion. The image data or the cropped image data may not display the full side of the official document. For example, a photograph may only display 70% of the front of an official document due to a thumb of a hand holding the document obscuring the remainder of the official document. This is not a problem provided there is enough of the official document visible in the image for the process to identify the characters. What aspects or fraction of the official document are necessary for it to be identified as a particular type, and thereby pass the authenticity test, will depend on the distinctiveness and form of the particular type of the official document. For example, identifying the official document may only require one text field to be identified or it may require two, three, or more text fields to be identified.

Characters may be identified and extracted from the image data using a variety of methods that are known to the skilled person. Such techniques are commonly used in image to text processing such as optical character recognition methods. Preferably, a convolutional neural network will be used.

The term "characters" relates to all characters that are designed to be read by a human that can be characterized as belonging to a particular font. Characters may relate to one or more individual characters, or multiple groups of characters. Characters may include letters from at least one alphabet, punctuation marks, and may also include symbols that serve as textual character replacements, such as Japanese kanji. Non-textual characters are characters, or a group of characters, that are not designed to be read by a human. Non-textual characters may be taken to be characters if they can be characterized by a font. A set of emojis, or a MRZ, may therefore be considered characters.

A genuine document can be any document, or image data thereof, which serves to present a sample of a particular font. Therefore, the genuine document need not be a valid official document but could be a template card, for testing purposes, containing characters of the particular font. Similarly, the genuine document may be a copy, provided that the presented images of the particular font are accurate representations.

Step 620 comprises using an embedded space model to form a first embedded space representation of the first set of characters. Again, this step may be performed at server 203. This step may be viewed as forming an invariant representation of the genuine font. Alternatively, it can be viewed as generating a description of the genuine font in a space of differing dimensionality. The precise form of the embedded space and the transformation thereto can, of course, be varied in manners that are known to the skilled person. In general, it may be said that an embedded space representation is a fixed-length vector representation of data. Preferably, the vector relates to a space with a lower number of dimensions than is needed to fully characterize the data in normal space.

To form the embedded space model that forms the embedded space representations, training is performed using characters from a plurality of fonts. In this way, the embedded space model can be trained to form font specific embedded space representations, each of which can be compared with a sample embedded space representation, to assess whether the embedded space representations relate to the same font.

In some embodiments of the present invention, step 610 is performed at an earlier time or on a different system to the later steps. The embedded space model, or one or more embedded space representations, may be copied, transferred or distributed to other systems. This allows new systems to operate without having to form an embedded space model or embedded space representations as they can reuse an existing model or existing embedded space representations. In some cases, the distributed embedded space model, or distributed embedded space representations, will need to be tested, using genuine documents, to ensure it is operating correctly on the different system. If not, an updated embedded space model may need to be formed and/or used to generate new embedded space representations, possibly by retraining the distributed model. The method of updating the embedded space model is similar to the method to form, or generate, the embedded space model, which is explained in detail below.

Step 630 is similar to step 610, except this time a second set of characters, which may be called sample extracted characters, is acquired from a sample document. The acquisition comprises analysis of image data of the sample document. A sample document is any document whose authenticity is being assessed by the system, or any known genuine document that is being processed by the system to check or improve the system's operation. For example, a genuine document may be processed to ascertain whether or not the system will correctly declare it as a genuine document. If not the system's operation may be adjusted.

For both steps 610 and 630, either separately or at the same time, the image data of the documents can be acquired in a number of known methods such as loading a file, taking and/or transferring a photograph, scanning an official document, or receiving and/or loading an image on to a computer. Acquisition of the image data is not limited to a particular method of acquiring the image data. Acquisition of the image data may therefore also comprise communication of the acquired image data to another system.

As an example, step 630 may comprise the camera 253 of the mobile electronic device 201 taking a photo of a sample document and thus acquiring image data of the sample document. This image data is then communicated to server 203 for processing to extract the second set of characters from the image data.

Step 640 comprises forming a second embedded space representation of the second set of characters. This may involve generating an embedded space representation of the second set of characters from the sample document in a similar manner to the process of forming the first embedded space representation.

Step 650 comprises comparing the first and second embedded space representations. The comparison may involve measuring the distances between the embedded space representations in embedded space. In other words, the distance between the representation of the first set of character and the representation of the second set of characters is assessed.

The analysis of the distance can be adjusted according to the requirements of a user. For example, in some cases a small distance may be set to improve the ability of the analysis to identify counterfeit documents. Alternatively, a large distance may be set to lower the rate of genuine documents that are wrongly marked as counterfeit. The analysis may have multiple criteria to pass when assessing the similarity of the embedded space representations and may include other metrics. More complex criteria will help to tailor the test and mitigate effects that may adversely affect quality of the testing. For example, the tailoring may ensure clearly incorrect characters do not slip through due to averaging, and may also ensure that single outliers, possibly due to image artefacts, do not dominate the analysis and skew the results.

Steps 610 to 650 provide a method for identifying if a font in a document matches a font in a genuine document, with such method being performed by server 203 or other equivalent electronic processing device. If the fonts match, it means that the document may be considered to be genuine. Storing and comparing the fonts in an embedded space provides an adaptable and thorough analysis that is applicable to all official documents having characters, in particular textual characters, which means it is applicable to almost all official documents. The embedded space comparison of the fonts is preferred to real space comparison, or normal image comparison, with template data, such as the vector data relating to the font. This is because real space comparisons are more easily affected by imaging artefacts. The imaging artefacts may be physical, which includes deliberate variations and systematic or random errors in the production of an official document, or they may be virtual, which includes file/image compression artefacts and effects that arise due to the image acquisition method such as a blurring due to an out of focus camera. By using embedded space representations, formed from data acquired in the same way as the sample data that is tested, the effects of imaging artefacts can be substantially mitigated.

Using an embedded space comparison is also preferable in situations in which no standard data of the font used on the genuine document is available. In some cases, it is prohibited to store a representation of the font used in a genuine document, e.g. for copyright reasons, which means a normal space comparison is effectively prohibited.

The method will now be explained in greater detail using an exemplary system according to an embodiment of the invention.

Figure 7:
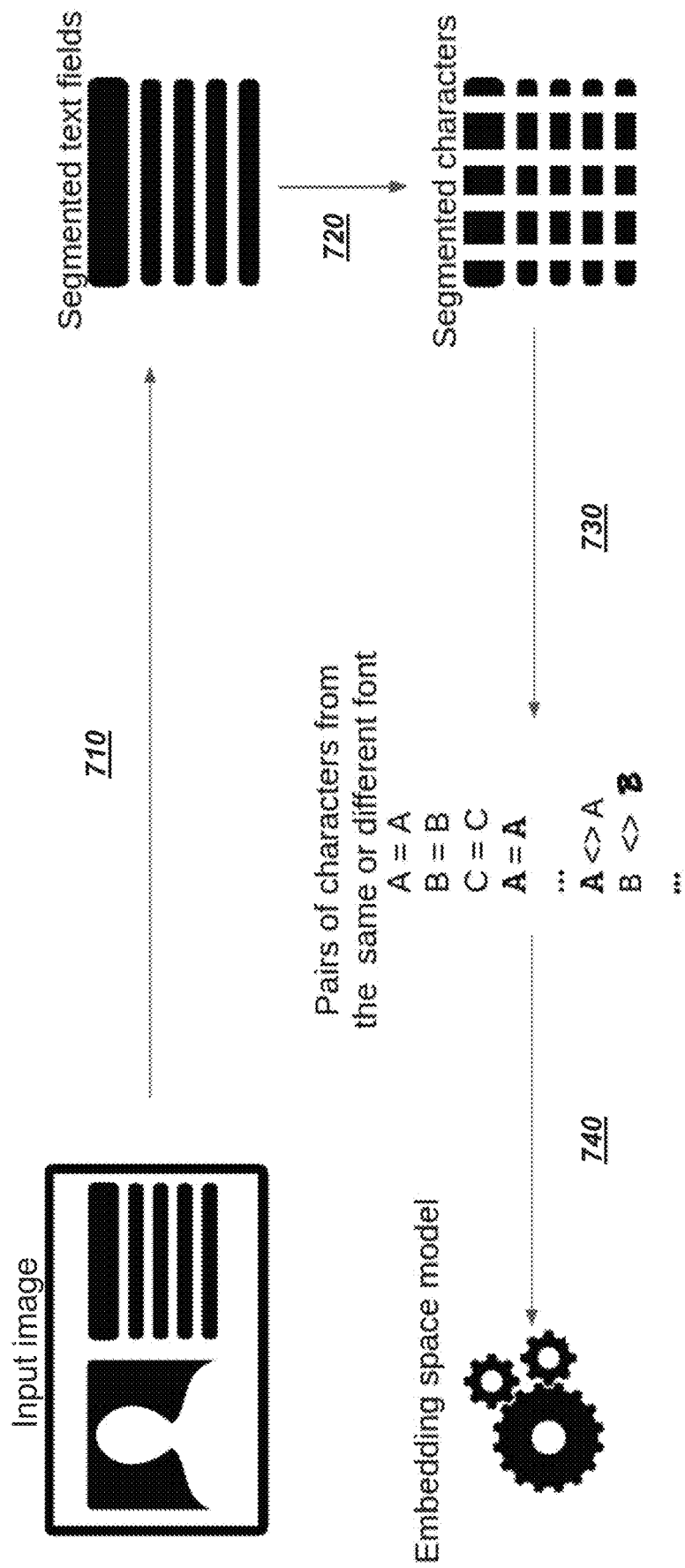
FIG. 7 is a flow diagram of a process to form an embedded space model according to an embodiment of the invention.

FIG. 7 describes the initialization process for the exemplary system 10. This is the process allowing embedding space model to be formed. The process steps are denoted by arrows. In a first step 710, text segmentation is performed on an acquired input image of a genuine document. The output of this step is several images containing all the text fields that have been recognized in the input document plus the labels for each of the fields, i.e. the name of the field, and a label that uniquely identifies the document format. The label includes data such as document type and issuing country.

Only one input document image is shown in FIG. 7, but in practice several may be used.

The segmentation step 710 comprises the assignment of semantic labels to the text fields found on the official document. In some embodiments, this step can be done manually by operators viewing and assigned the text fields labels that they consider to be correct. Preferably, the text field data is acquired by optical character recognition (OCR).

The result of the first step 710 affects the robustness and performance of the overall system. For instance, a wrong assignment of the label 'Last Name' on extracted characters that correspond to the actual 'First Name' of the appeared subject will lead to incorrect details being recorded or tested. Therefore, improved automated methods are preferred to increase the robustness of this step. The improved automated method of segmenting is called semantic labelling.

To explain semantic labelling, consider that different documents of a specific type, for example a UK driving license, can be viewed as deformed versions of the shape and appearance or texture of a deformable document. The shape of the document is represented by a set of semantically meaningful points, which are landmarks or points that correspond to distinctive parts of the document. Similarly, the document's appearance is defined as the set of pixel intensities that are included in the convex hull defined by the landmarks. A virtual deformable document is formed using models that capture the variance of shape and/or appearance information across a training set of annotated documents of the same type.

Referring to FIG. 9, after the deformable model has been formed (9a), the landmarks of a given document with the same type to the training documents, are localised by fitting the model. To this end, optionally, first the bounding box of the document is detected by applying a document detection technique 9b and subsequently used to initialise the fitting procedure. In some cases, document detection is not required and the fitting can be attempted directly to the deformable model.

After obtaining the fitted landmarks, the other areas of the document can be found by projecting a template 9c on to a sample, or tested, document. An exemplary result of using the projection landmarks is shown at 9d.

The semantic labelling of the results produced by the OCR is performed by computing the overlaps between all the bounding boxes and selecting those with the maximum value. At 9e the results obtained by the OCR system are depicted while the bounding boxes with maximum overlap to the bounding boxes 9d correspond to a set of specific keywords are shown at 9f.

To finish the semantic labelling process, there is a final post-processing step where irrelevant or superfluous data is filtered 9g to leave only meaningful labelled data.

Returning to FIG. 7, the second step 720 of the process to form the embedded space model comprises character segmentation of the text field images produced by first step 710. The result of this second step 720 is an image for every character of every text field. One exemplary process of character segmentation would be as follows:

- Converting all coloured images to grayscale by removing hue and saturation information;
- Applying a global threshold to quantize the intensity image and form a binary image;
- Detecting all connected components, that is islands or objects, in the binary image;
- Removing all components containing fewer than a set number of pixels, which is preferably 30 pixels; and
- Labelling all components from "0", which indicates the background, to "N", where N is a real integer which indicates the Nth object, using the specified 8-connected pixel grid; and
- Obtaining the minimal enclosing bounding box based on the label map.

Of course, additional standard image processing techniques may be added or substituted for the above steps or sub-steps provided the outcome is substantially the same.

Preferably, to overcome wrongly segmented characters, automated character classification is used to label and order the images obtained during the character segmentation process. One exemplary character classification process would be as follows. Firstly, a pre-processing step is performed where all images are resized so the height of the images is a set number of pixels, e.g. 720 pixels. In a preferred embodiment the set height of the images is 105 pixels.

The resized images are then passed to a convolutional neural network architecture that is used to extract features from those images. Neural networks (NN) can be considered as collections of neurons that are connected in an acyclic graph. Generally, individual neurons have learnable weights and biases, and are organized into distinct layers. The architecture of the neural network relates to the number of layers and the connections between them. Convolutional neural networks (CNN) are a form of neural networks that are typically used to process images, which allows certain advantageous properties to be encoded into the NN architecture. These properties makes CNNs more efficient and help reduce the number of parameters in the network. The architecture of the CNN can be adapted and adjusted according to the needs of the user and the typical data to be processed.

In a preferred embodiment, the process uses a CNN with two final (on top) fully connected layers to perform a final classification. A fully connected layer being a layer which is fully pairwise connected to another layer. The final, or top, layer of a CNN refers to the last layer in the order in which the processing occurs in the model of the CNN.

To use a CNN, it must first be trained to adapt individual neurons' responses to particular inputs and ultimately achieve the desired system performance. A trained CNN is one that has been setup to perform a desired function. A CNN is preferably trained until it has converged to a desired processing performance or error rate, which may correspond to a set of optimal weights of the individual neurons. Training requires exemplary data, and a lot of data may be required to adequately train the system and ensure it has converged.

The present system preferably uses a CNN that has been training using artificially-generated images. To generate artificially-generated images, a random background is selected from a selection of backgrounds and a random font is selected from a selection of fonts. The selection of fonts and selection of backgrounds may be acquired from sources of authentic data. An image of a character of the selected font is then formed on the selected background. The image may then altered by various perturbations, including at least one of a perspective transformation, a lightning change, adding random glare, adding noise such as Gaussian noise, adding random blur, uncentring, rotating, skewing or any other standard image processing technique. The resultant image is an artificially-generated image.

The selection of font and backgrounds may come from images of real official documents. This enables a good font representation to be formed without having access to sample template data, such as the original vector representation of the font. Additionally, when real official document derived data, rather than synthetic samples, is used the CNN is trained with data that is much closer to the data that will be encountered in use. This improves the performance of the CNN.

In the exemplary system, the CNN is trained until it converges, which typically requires less than one million artificially-generated images to be processed by the CNN. The performance of the trained CNN does not need to be perfect and some characters can be lost or wrongly assigned in the second step 720. This robust nature of the system arises due to the probabilistic nature of the method. In other words, the system operates correctly when a set fraction or more of characters has been correctly assigned and does not requires every character to be correctly identified. The output of the second step 720 is a labelled set of images.

A third step 730 comprises semi-automated font pairs labelling. The step starts by receiving characters images with one or more labels for each image, and a document field label and a document format label both of which are as acquired and/or used in step 710. The third step 730 preferably uses an internal database of fonts that has been created manually by inspecting characters in pairs of documents.

Normally, the labelling process is difficult because there are a large number of pairs of documents. By way of demonstration, for a small database of 150 document formats there are 11175 same/not same pairs. The number of same/not same pairs can increase rapidly if we consider different types of fonts within a given document, which is likely to occur as different fields in a document may have different fonts. The present invention addresses this problem using weak labelling pairs. Weak labelling use prior knowledge about the documents to assist labelling by labelling of document fields pairs in three categories: same, not same, or unknown. With this incomplete set of labels a large number of valid character pairs can be automatically created. These automatically generated character pairs can then be used to train, validate, and test the system. This weak labelling technique provides a practical automated alternative to the labour intensive manual labelling technique.

The fourth step 740 relates to the process of forming the embedded space model. To form the embedded space model, the system uses the negative (not-same) and positive (same) pairs of characters to form. a function which takes an image as input and produces a real-valued vector of 2048 length. This function is a 50 layer Residual Network CNN, and has been described in detail by Kaiming He et al. during the 2016 IEEE Conference on Computer Vision and Pattern Recognition see the proceeding page 770 (ResNet-50). The output of the fourth step 740 is an embedded space model that can project an image of a character into an embedding space that represents that character and font, the projection is called the embedded space representation. This process could be completed using other embedded space models but the described embedded space model is particularly efficient due to its optimized architecture.

The training, of forming, of the embedded space forming CNN, or embedded space model, uses a Siamese network. This method has two key aspects, firstly the training is done using batches of pairs of samples, as opposed to a batch of individual samples, and secondly it uses a contrastive loss function. A contrastive loss function penalizes pairs which are labelled as different but have a low Euclidean distance in the embedding space and also penalizes pairs which are labelled as having the same font but have a large Euclidean distance in the embedding space.

The synergistic effects of the Siamese network and the 50 layer Residual Network CNN helps increase the performance of the embedded space model in quickly forming good quality embedded space representations.

Once the embedded space model has been formed, or trained, the system is said to be initialized and is ready to start processing documents to ascertain their authenticity. As described above in some cases, the steps to form the embedded space model need not be performed on every system as information, or indeed the entire embedded space model, can be transferred from a different system or from previous configurations of one system.

Figure 8:
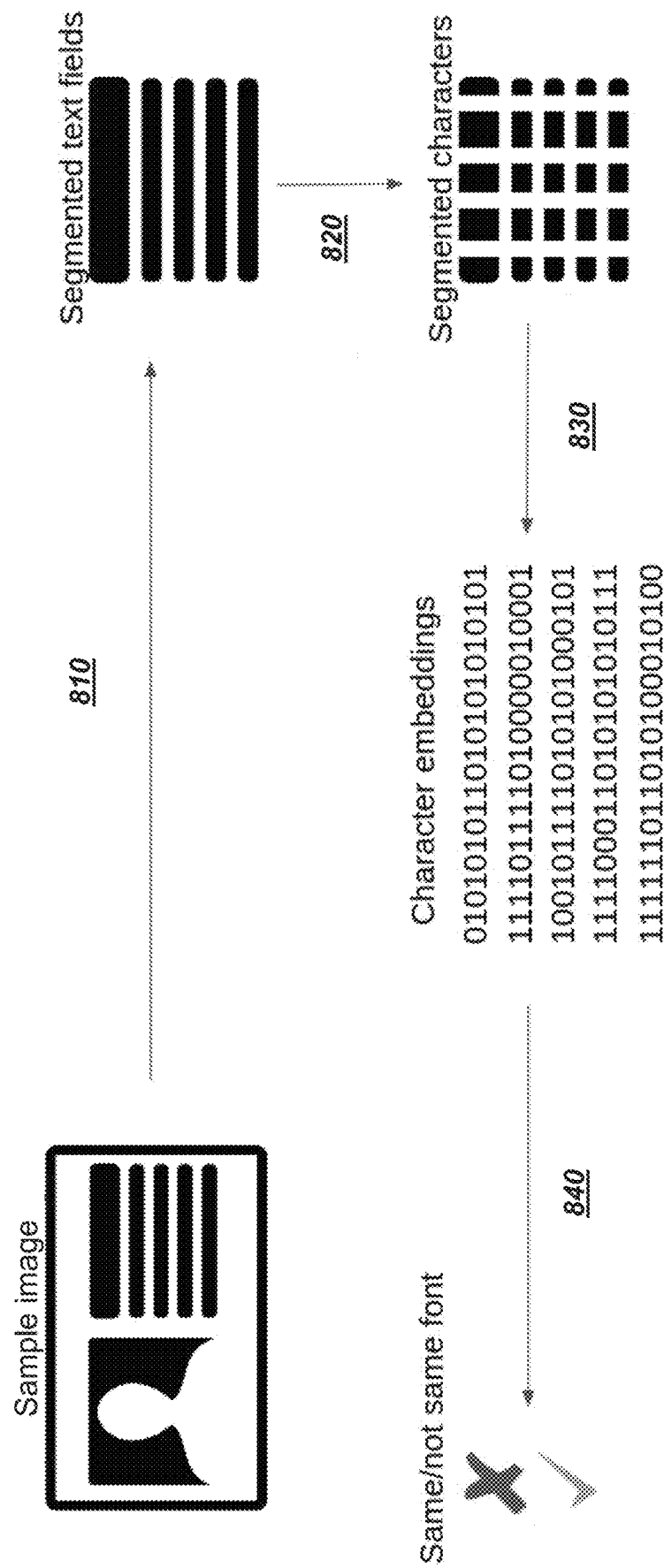
FIG. 8 is a flow diagram of a process to assess the authenticity of a sample image according to an embodiment of the invention.

The runtime process, which is the method operated to test the authenticity of sample documents comprises four steps as shown in FIG. 8. First step 810 is a text segmentation step, which is effectively the same as first step 710 in the above-described process to initialize the system but using a sample document.

Second step 820 is a character segmentation step, which is effectively the same as the second step in the process to initialize the system.

The third step 830, is a character-level embedding extraction step. This step takes the characters images with at least label for each image that were formed in the second step 820 and the character labels, and takes the document field label and document format label as used in the first step 810; and outputs a list of embedding representations, with one embedding representation per image or character and associated labels, which are all carried to the next step. The process of forming the embedded representations uses the embedded space model described in step four 740 of the process to initialize the system.

The fourth step 840 is a binary decision for each field. In this step, the list of the embedded space representations and corresponding labels from the third step 830 are processed. The processing comprises computing the similarity, which is inversely proportional to the distance from each of the embedded space representations to the corresponding embedded space representations of the particular font, corresponding to the genuine font in a corresponding official document, which is stored in an internal reference database.

Preferably, the final similarity score for each text field is the averaged score for all the characters of that text field. The final output is a list of confidence values, one value per text field that indicates if the text field has the genuine font or not. These values can be combined or analysed separately to come to a final result on whether the sample document is authentic.

The result of this determination can be communicated to an operator or to a user, e.g. via electronic device 201, 202, who supplied the sample document. The result may indicate that further authenticity checking is required. Alternatively, it may prompt to repeat the assessment of authenticity, request further images of the documents, or request other official documents to be supplied.

Dependent on the performance of the method, operators may also provide information regarding the use of genuine font in a particular text field. They may also flag the result of the assessment as a false positive or false negative. All of this data may be recorded and used to fine tune the method and the operational parameters to improve future performance. In some cases, the recording of this information and the feedback may by an offline procedure. In other cases, the method may adjust operational parameters, and/or retrain the individual CNNs, once suitable feedback is available.

Typically, other methods for font matching are only able to give an indication of a degree of similarity and have issues with fonts that are visually similar. The present invention may also output a font similarity, but because the matching process has been trained with fonts that are very similar, the embedding space model is formed in such a way that it is forced to make embedded representation that serve to separate similar fonts, even for very similar fonts.

The Siamese network in combination with the 50 layer CNN enables this enhanced performance. As a result of the above process and the enhanced performance, operators can simply set a threshold that performs the final decision as to whether a font is genuine or not, which can be used to ascertain whether or not a sample document is a genuine document. As described above, once the performance of the system has been assessed, the threshold can be adjusted as necessary to achieve the desired level of discrimination.

A typical classification network is not forced to separate similar fonts. Thus typical classification networks may form embedding space representation that do not adequately distinguish between similar fonts.

As explained, the initialization and runtime process described above, and shown in FIGS. 7 and 8, may in one embodiment be executed by the server 203. The sample image that is input to the runtime process may be image data of a document captured by camera 253 of mobile electronic device 201 that is communicated to the server 203. The mobile electronic device 201 can include an application executable on the device 201 which coordinates the use of the camera 253, the communication of the image data to the server 203, and the reporting on the display 204 of the assessment result reported by the server 203. A user may therefore work the invention via mobile electronic device 201 or, alternatively, via any other user electronic device that is connected to the wireless network 101.

Such user electronic devices 201, 202 are generally termed communication devices and may be mobile or handheld devices, such as a mobile or handheld communication device. It may also have the capability to communicate with other computer systems; for example, via a data link or network, such as a short-range radio frequency link, e.g. Bluetooth, or via a data network, which may be wireless and/or may be connected to the Internet. In certain embodiments, the user electronic device is a multiple-mode communication device configured for both data and voice communication, a mobile telephone, such as a smartphone as shown in FIG. 7, a wearable computer such as a watch, a tablet computer, a personal digital assistant, or a computer system such as a notebook, laptop, or desktop system. The user electronic device may take other forms apart from those specifically listed above, for example a fixed location server or a remotely accessed computer system. The user electronic device may also be referred to as a mobile, handheld or portable communications device, a communication device, or a mobile device. In the context of this disclosure, the term "mobile" means the device is of a size or weight which makes it readily portable by a single individual.

The electronic devices 201, 202 may include a controller including a processor 240 (such as a microprocessor) which controls the operation of the electronic device 201, 202 In certain electronic devices, more than one processor is provided, typically, with each processor in communication with each other and configured to perform operations in parallel, so that they together control the overall operation of the electronic device. The processor 240 interacts with device subsystems, such as a wireless communication subsystem 211 for exchanging radio frequency, or microwave frequency, signals with a wireless network 101 to perform communication functions. The processor 240 is communicably coupled with additional device subsystems, some of which are shown on FIG. 4, including:

one or more output interfaces 205 (such as one or more of: a display 204, a speaker 256, and an electromagnetic (EM) radiation source 257);

one or more input interfaces 206 (such as one or more of: a camera 253, microphone 258, keyboard, control buttons, a navigational input device, and a touch-sensitive overlay) associated with at least one of a touchscreen 204, an orientation subsystem 249, and memory 244 (such as flash memory, random access memory (RAM), read only memory (ROM), etc.);

auxiliary input/output (I/O) subsystems;

a data port (which may be a serial data port, such as a Universal Serial Bus (USB) data port);

an external video output port;

a near field communications (NFC) subsystem;

a short-range communication subsystem;

a clock subsystem;

a battery interface; and other device subsystems.

Some of the subsystems perform communication-related functions, whereas other subsystems may provide "resident" or on-device functions.

The electronic device 201, 202 stores data 227 in an erasable persistent memory, which in one embodiment is the memory 244. In various embodiments, the data 227 includes service data including information used by the electronic device 201, 202 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, services, applications, games and other commonly stored user information stored on the electronic device 201, 202 by its user. The data 227 may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory) of the electronic device 201, 202 may be organized, at least partially, into one or more databases or data stores.

In at least some embodiments, the electronic device 201, 202 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some embodiments, the electronic device 201, 202 includes a communication subsystem 211 which allows the electronic device 201, 202 to communicate over a wireless network 101. The communication subsystem 211 includes a receiver, a transmitter, and associated components, such as one or more antenna elements 214, local oscillators (LOs) 216, and a processing module such as a digital signal processor (DSP) 217 which is in communication with the processor 240. The antenna elements 214 and 215 may be embedded or internal to the electronic device 201, 202 and a single antenna may be shared by both receiver and transmitter. The particular design of the wireless communication subsystem 211 depends on the wireless network 101 in which electronic device 201, 202 is intended to operate.

In at least some embodiments, the electronic device 201, 202 also includes a device orientation subsystem 249 including at least one orientation sensor which is connected to the processor 240 and which is controlled by one or a combination of a monitoring circuit and operating software. The orientation sensor detects the orientation of the electronic device 201, 202 or information from which the orientation of the electronic device 201, 202 can be determined, such as acceleration. An orientation sensor may generate orientation data which specifies the orientation of the electronic device 201, 202.

The electronic device 201, 202 includes a microphone or one or more speakers. In at least some embodiments, the electronic device 201, 202 includes a plurality of speakers 256. Each speaker 256 may be is associated with a separate audio channel. The multiple speakers may, for example, be used to provide stereophonic sound (which may also be referred to as stereo).

The electronic device 201, 202 may also include one or more cameras 253. The one or more cameras 253 may be capable of capturing images in the form of still photographs or motion video. In at least some embodiments, the electronic device 201, 202 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201, 202 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201, 202 or the housing of the electronic device 201, 202. In such embodiments, the direction of capture of the camera is always predictable relative to the display 204 or the housing. In at least some embodiments, the camera may be provided in a central location relative to the display 204 to facilitate image acquisition of a face. A back facing camera may be used alternatively to, or in addition to, in some embodiments.

In at least some embodiments, the electronic device 201, 202 includes an electromagnetic (EM) radiation source 257. In at least some embodiments, the EM radiation source 257 is configured to emit electromagnetic radiation from the side of the electronic device which is associated with a camera 253 of that electronic device 201, 202. For example, where the camera is a front facing camera 253, the electronic device 201, 202 may be configured to emit electromagnetic radiation from the front face of the electronic device 201, 202. That is, in at least some embodiments, the electromagnetic radiation source 257 is configured to emit radiation in a direction which may visible by the camera. That is, the camera 253 and the electromagnetic radiation source 257 may be disposed on the electronic device 201, 202 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

The electronic device 201, 202 also includes a battery 238 as a power source, which is typically one or more rechargeable batteries that may be charged. The processor 240 operates under stored program control and executes software modules 221 stored in memory such as persistent memory; for example, in the memory 244. The software modules 221 include operating system software 223 and other software applications 225.

The electronic device 201, 202 processor 240 is configured to execute executable code stored in memory, wherein the executable code comprises instructions for performing the method of the present invention. The code can be stored in any suitable memory.

The electronic device 201, 202 can be supplied with the code preinstalled. Alternatively, the code can be loaded by the user or others on to the phone in the ways that are known to the skilled person, such as by data transfer through a USB cable or by downloading the code via a wireless communication Preinstalling or loading the code is equivalent to installing the code. Preferably, the code is in the form of an application. The application can be provided by a third party application providing service, as is common on modern electronic devices. Code updates may be loaded on to the electronic devices in a similar manner.

The code may operate by contacting one or more external systems, such as a server 203, and exchanging data with the external systems. This prevents all the processing, or calculations, having to occur on the electronic device 201, 202 which is useful to spare processing load and thus battery power. The electronic device 201, 202 may use one preferred communication method to exchange data or it may select the optimal communication method in light of those that are available, The selection of communication methods can be adaptive or responsive. By way of non-limiting example, if a wireless network communication signal using the IEEE 802.11 standard (WiFi) is initially available but lost, as the electronic device moves out of WiFi range, the electronic device may switch to a wireless network communication signal using the CDMA200 standard (3G) to continue the data exchange with the server 203. The data may be seamlessly transferred without interruption or the data transfer may pause during the switch over and be restarted thereafter either automatically or by the user.

In some embodiments, all the processing can occur on a user electronic device to prevent the need to contact external systems. This is especially useful if the user electronic device is a portable electronic device that may move into area in that is outside of all useful communications networks, since the functionality of the method is then not dependent of the availability of a communication network. In some cases, the execution of the code may cause the user electronic device to ascertain whether or not a communications network is available and select the operation mode accordingly, the assessment may be ongoing, periodic, or occur a limited number of times.

The code may provide flags, signals, or indications to other applications or services that the user electronic device is equipped with the extra functionality afforded by the present invention. Additionally, the code may be accessible by other applications or services to provide its functionality within the other application and services. For example, once installed the code may flag a financial application that extra security features are installed. The financial application may thus unlock, or enable, more sensitive functions and execute the code, to increase security, when these features are used. An exemplary use of code, which executes in accordance with the present invention, is described below.

Consider a user who wishes to register for a secure service, which requires registered users to be authenticated, this can be achieved via an application (or webpage) accessed via electronic device 201, 202. When the application is first accessed it checks the features and applications loaded on to the electronic device 201, 202, and proceeds to advise the user to install an identification authentication application. It may also direct the user to a location to download the identification authentication application. The user proceeds to download the identification authentication application and load it on to the electronic device 201, 202. When the user returns to the service, the service detects that the identification authentication application is loaded and executes, or calls, the identification authentication application. The identification authentication application then prompts the user, via display 204 or speaker 256, to use the camera 253 to take a photo of an official identification document, possibly using a separate camera application. Once a photo of an official document has been acquired, the identification authentication application sends the image data to a server 203 that performs an assessment of whether the photographed official document is genuine. The assessment uses the process described above. If the document is considered to be authentic, the identification authentication application may proceed to extract information, such as name and date of birth from the image data of the official document. The result is then communicated from the server 203 back to the service. The identification authentication application then communicates this information to the service. The service knows the identification authentication application provides only information that has been checked for authenticity. Therefore, the service can use the supplied information to register the new user.

If the server 203 had decided that the photographed official document was not genuine it may provide information to alert the service. Alternatively, it may alert the user and request further images of the official document or request images of alternative official documents.

Additional methods to ascertain the authenticity of the official document, such as calling the user to conduct a telephone interview, may also be performed to increase confidence in the result reported by the security application.

The following is a list of aspects of the disclosure, and forms part of the description.

Aspect 1. A computer-implemented method for assessing if characters in a sample image are formed from a predefined font comprising:
  forming a first embedded space representation for the predefined font;
  extracting sample characters from the sample image;
  forming a second embedded space representation of the sample characters; and
  comparing the first and second embedded space representations to assess if the sample characters are of the predefined font.

Aspect 2. The computer-implemented method of aspect 1, wherein forming a first embedded space representation for the predefined font comprises:
  extracting training characters from at least one image, the training characters comprising characters of the predefined font; and
  forming a first embedded space representation for the predefined font using the training characters.

Aspect 3. The computer-implemented method of aspect 2, wherein the training characters comprise characters from at least two fonts, one of which is the predetermined font.

Aspect 4. The computer-implemented method of aspect 2 or 3, wherein the predefined font is a characteristic font of an authentic document.

Aspect 5. The computer-implemented method of any one of aspects 2, to 4 wherein the at least one image comprises at least one image of at least one authentic document, and wherein the sample image is an image of a sample document to be tested for authenticity.

Aspect 6. The computer-implemented method of aspect 5, further comprising determining whether or not the sample document is authentic using the result of the assessment on whether the sample characters are of the predefined font.

Aspect 7. The computer-implemented method of any preceding aspect depending on aspect 2, wherein extracting training characters comprises, for each image of the at least one image, segmentation of the image to extract at least one text field.

Aspect 8. The computer-implemented method of any preceding aspect, wherein extracting sample characters comprises segmentation of the sample image to extract at least one text field.

Aspect 9. The computer-implemented method of aspect 7 or 8, wherein at least one text field comprises a plurality of text fields.

Aspect 10. The computer-implemented method of aspect 7 or 8, wherein at least one text field is a text field.

Aspect 11. The computer-implemented method any one of aspects 7 to 10, wherein segmentation of the image to extract at least one text field comprises extracting a text field image of the at least one text field.

Aspect 12. The computer-implemented method of aspect 11, wherein extracting training characters from at least one image of at least one authentic document comprises labelling the text field image with at least one text field label.

Aspect 13. The computer-implemented method of aspect 12, wherein at least one text field label comprises a plurality of text field labels.

Aspect 14. The computer-implemented method of aspect 12, wherein at least one text field label is a text field label.

Aspect 15. The computer-implemented method of any preceding aspect depending on aspect 2, wherein extracting training characters from at least one image comprises labelling each of the at least one images with at least one document label.

Aspect 16. The computer-implemented method of aspect 15, wherein at least one document label comprises a plurality of document labels.

Aspect 17. The computer-implemented method of aspect 15, wherein at least one document label is a document label.

Aspect 18. The computer-implemented method of any preceding aspect, wherein extracting sample characters from the sample image comprises labelling the sample document with at least one sample document label.

Aspect 19. The computer-implemented method of any preceding aspect depending on aspects 2 and 11, wherein extracting training characters from at least one image comprises segmentation of the text field image to extract character images.

Aspect 20. The computer-implemented method of any preceding aspect depending on aspect 11, wherein extracting sample characters from the sample image comprises segmentation of the text field image to extract character images.

Aspect 21. The computer-implemented method of aspect 19 or 20, wherein segmentation of the text field image to extract character images comprises:
 converting the text field image to grayscale;
 thresholding the grayscale image of the text field using a threshold value;
 removing all pixel groups in the threshold image that contain less than a number of pixels;
 identifying all remaining pixel groups;
 identifying the minimal bounding box for identified pixel groups; and
 using the minimal bounding box to extract character images from the text field image.

Aspect 22. The computer-implemented method of aspect 21, wherein the number of pixels is 30 pixels.

Aspect 23. The computer-implemented method of aspect 21 or 22, wherein identifying all remaining pixel groups comprises labelling all pixel groups from 0, indicating background, to N, indicating the Nth object, with a specified 8-connected pixel grid.

Aspect 24. The computer-implemented method of any of aspects 21 to 23, wherein the extracted character images are resized to be a set size.

Aspect 25. The computer-implemented method of aspect 24, wherein the set size is an image with a height of 105 pixels.

Aspect 26. The computer-implemented method of any of aspects 19 to 25, wherein segmentation of the text field image to extract character images comprises using character classification to:
 obtain at least one character label; and
 order character images into an ordered list of character images.

Aspect 27. The computer-implemented method of aspect 26, wherein the at least one character label comprises a character label for each extracted character image.

Aspect 28. The computer-implemented method of aspects 26 or 27, wherein using character classification comprises using a convolutional neural network to extract features from the characters images.

Aspect 29. The computer-implemented method of aspect 28, wherein the layers of the convolutional neural network comprise two fully connected final layers to perform the final classification.

Aspect 30. The computer-implemented method of aspect 28 or 29, wherein the convolutional neural network architecture is optimized for use with generated images.

Aspect 31. The computer-implemented method of any of aspects 28 to 30, wherein the convolutional neural network is trained using generated images.

Aspect 32. The computer-implemented method of aspect 30 or 31, wherein the generated images are generated by:
 randomly selecting a background and randomly selecting a font;
 generating a test image comprising a character of the selected font on the selected background;
 perturbing the test image by a random image processing process.

Aspect 33. The computer-implemented method of aspect 32, wherein the random image processing set comprises at least one of:
 applying a perspective transform;
 changing the lighting;
 applying a glare effect;
 adding noise;
 adding blur; and
 translating the image to uncentre it.

Aspect 34. The computer-implemented method of aspect 33, wherein changing the lighting comprises adjusting the brightness and/or contrast in the colour channels of the test image.

Aspect 35. The computer-implemented method of any of aspects 26 to 34, wherein the ordered list of character images and the at least one character label are used to form a list of pairs, each pair being two images of the same character in either a font that is the same, or a font that is different.

Aspect 36. The computer-implemented method of aspect 35, wherein forming the list of pairs comprises using a database that has been compiled from data acquired by manually inspecting at least one pair of sample documents of a known type.

Aspect 37. The computer-implemented method of aspect 36, wherein forming the list of pairs further uses weak labelling.

Aspect 38. The computer-implemented method of aspect 37 when dependent on aspect 9, wherein weak labelling comprises using prior knowledge on the relationship between the plurality of text fields.

Aspect 39. The computer-implemented method of aspect 38 when dependent on aspect 2, wherein the prior knowledge is acquired before extracting training characters from at least one image is performed.

Aspect 40. The computer-implemented method of aspect 38 or aspect 39, wherein the relationship between the plurality of text fields comprises the result of at least one comparison of the fonts of a pair of text fields from the plurality of text fields.

Aspect 41. The computer-implemented method of aspect 40, wherein the relationship comparison outcome is one of same, different, or unknown.

Aspect 42. The computer-implemented method of any preceding aspect depending on aspect 35, wherein an embedded space model is formed using the list of pairs, and wherein the embedded space model comprises a function for converting image data into a real-valued vector.

Aspect 43. The computer-implemented method of aspect 42, wherein an embedded space representation is formed using:
 the embedded space model;
 the ordered list of character images; and
 the at least one character label.

Aspect 44. The computer-implemented method of aspect 42 or 43, wherein the vector has a length of 2048.

Aspect 45. The computer-implemented method of any one of aspects 42 to 43, wherein the function comprises a converting convolutional neural network.

Aspect 46. The computer-implemented method of aspect 45, wherein the converting convolutional neural network has 50 layers.

Aspect 47. The computer-implemented method of any preceding aspect, wherein forming an embedded space model comprises using a Siamese network.

Aspect 48. The computer-implemented method of any one of aspects 1 to 47, wherein extracting sample characters from the sample image comprises obtaining a list of embedded representations of the character images using a Siamese network.

Aspect 49. The computer-implemented method of aspects 47 or 48, wherein the operation of the Siamese network comprises:
processing batches of samples; and
using a contrastive loss function.

Aspect 50. The computer-implemented method of any one of aspects 47 to 49 when depending on aspect 45, wherein the Siamese network trains the converting convolutional neural network that produces the embedded space representation.

Aspect 51. The computer-implemented method of any preceding aspect depending on aspect 26 and 48, wherein each embedded representation in the list of embedded representation comprises a character label from the at least one character label.

Aspect 52. The computer-implemented method of any preceding aspect, wherein the steps up to forming a first embedded space representation are performed as an initialization step before the authenticity of any document is assessed.

Aspect 53. The computer-implemented method of any preceding aspect, wherein the steps of extracting sample characters, forming a second embedded representation and comparing the first and second embedded space representations are repeated for every sample image that is processed.

Aspect 54. The computer-implemented method of any preceding aspect, wherein each second embedded space representation is compared to a first embedded space representation formed using a reference database.

Aspect 55. The computer-implemented method of any preceding aspect, wherein comparing the embedded space representations comprises:
computing the similarity of the embedded representations; and
calculating a final similarity score by averaging the calculated similarity scores.

Aspect 56. The computer-implemented method of aspect 55, wherein the final similarity score is compared to a threshold to decide if the representations are similar and thereby decide if the sample document is genuine.

Aspect 57. The computer-implemented method of any preceding aspect, wherein the outcome of the assessment as to whether the sample characters are of the predefined font is communicated to a user.

Aspect 58. The computer-implemented method of any preceding aspect, wherein the characters are textual characters.

Aspect 59. The computer-implemented method of any preceding aspect, wherein operator decisions as to whether a font in a selected text field is genuine or not is used to update operational parameters.

Aspect 60. A computer-readable medium comprising executable instructions for performing the method of any one of the preceding aspects.

Aspect 61. A computer comprising a processor configured to execute executable code stored in memory, wherein the executable code comprises instructions for performing the method of any one of the preceding aspects.

The present invention has been described above by way of example only, and modifications of detail may be made which fall within the scope of the invention which is defined by the appended claims.

What is claimed is:

1. A method for assessing if characters in a sample image are formed from a predefined font comprising:
forming a first embedded space representation for characters of the predefined font;
extracting sample characters from the sample image;
forming a second embedded space representation of the sample characters; and
comparing the first and second embedded space representations to assess if the sample characters are of the predefined font, wherein the first embedded space representation for the predefined font and the second embedded space representation of the sample characters, is a transformed representation in a mathematical space that has a lower number of dimensions than the number of dimensions in a normal space needed to fully characterize the untransformed sample characters or the untransformed predefined font;
wherein each of the embedded space representations is a fixed-length vector representation of the sample image or the predefined font.

2. The method of claim 1, wherein forming a first embedded space representation for the predefined font comprises:
extracting training characters from at least one image, the training characters comprising the characters of the predefined font; and
forming a first embedded space representation for the predefined font using the training characters.

3. The method of claim 2, wherein the training characters comprise characters from at least two fonts, one of which is the predetermined font.

4. The method of claim 2 wherein the at least one image comprises at least one image of at least one authentic document, and wherein the sample image is an image of a sample document to be tested for authenticity.

5. The method of claim 2, wherein extracting training characters comprises, for each image of the at least one image, segmentation of the image to extract at least one text field.

6. The method of claim 1, wherein extracting sample characters comprises segmentation of the sample image to extract at least one text field.

7. The method of claim 5, wherein segmentation of the image to extract at least one text field comprises extracting a text field image of the at least one text field, and
segmentation of the text field image to extract character images.

8. The method of claim 7, wherein segmentation of the text field image to extract character images comprises:
converting the text field image to grayscale;
thresholding the grayscale image of the text field using a threshold value;
removing all pixel groups in the threshold image that contain less than a number of pixels;
identifying all remaining pixel groups;
identifying the minimal bounding box for identified pixel groups; and
using the minimal bounding box to extract character images from the text field image.

9. The method of claim 7, wherein segmentation of the text field image to extract character images comprises using character classification to:
obtain at least one character label; and
order character images into an ordered list of character images, wherein using character classification comprises using a convolutional neural network to extract features from the characters images.

10. The method of claim 9, wherein the convolutional neural network is trained using generated images, wherein the generated images are generated by:
  randomly selecting a background and randomly selecting a font;
  generating a test image comprising a character of the selected font on the selected background;
  perturbing the test image by a random image processing process.

11. The method of claim 9, wherein the ordered list of character images and the at least one character label are used to form a list of pairs, each pair being two images of the same character in either a font that is the same, or a font that is different.

12. The method of claim 11, wherein a transforming function is formed using the list of pairs that is configured to convert input image into a real-valued vector, and
  wherein each embedded space representation is formed by passing the predefined font or the sample image to the transforming function.

13. The method of claim 12, wherein the transforming function is formed using a Siamese network.

14. The method of claim 1, wherein the first embedded space representation is obtained from a reference database; and wherein the steps of extracting, forming the second embedded space representation, and comparing are repeated for every sample image that is processed to form at least one similarity score.

15. The method of claim 1, wherein comparing the first and second embedded space representations comprises:
  computing a plurality of similarity scores of the first and second embedded space representations for the sample characters; and
  calculating a final similarity score by averaging the plurality of similarity scores.

16. A non-transitory computer-readable storage medium comprising executable instructions for performing the method of claim 1.

17. The method of claim 12, wherein the transforming function is configured to convert an input image into a real-valued vector of 2048 length.

18. The method of claim 12, wherein the ordered list of character images is ordered alphabetically.

* * * * *